(12) United States Patent
Mizuta et al.

(10) Patent No.: US 10,730,098 B2
(45) Date of Patent: Aug. 4, 2020

(54) METHOD OF MANUFACTURING ROLLING BEARING RING

(71) Applicant: NTN CORPORATION, Osaka-shi, Osaka (JP)

(72) Inventors: Kohei Mizuta, Kuwana (JP); Chikara Ohki, Kuwana (JP)

(73) Assignee: NTN CORPORATION, Osaka (JP)

( * ) Notice: Subject to any disclaimer, the term of this patent is extended or adjusted under 35 U.S.C. 154(b) by 337 days.

(21) Appl. No.: 15/758,223

(22) PCT Filed: Aug. 23, 2016

(86) PCT No.: PCT/JP2016/074476
§ 371 (c)(1),
(2) Date: Mar. 7, 2018

(87) PCT Pub. No.: WO2017/043304
PCT Pub. Date: Mar. 16, 2017

(65) Prior Publication Data
US 2018/0243814 A1 Aug. 30, 2018

(30) Foreign Application Priority Data
Sep. 8, 2015 (JP) .................................. 2015-176495

(51) Int. Cl.
*B21D 53/10* (2006.01)
*C21D 9/40* (2006.01)
(Continued)

(52) U.S. Cl.
CPC ............. *B21D 53/10* (2013.01); *B21D 19/08* (2013.01); *B21D 22/022* (2013.01); *B21D 22/20* (2013.01);
(Continued)

(58) Field of Classification Search
CPC ........ B21D 53/10; B21D 22/20; B21D 24/16; C21D 1/18
See application file for complete search history.

(56) References Cited

U.S. PATENT DOCUMENTS 6,386,981 B1   5/2002 Birk et al.
7,950,261 B2 * 5/2011 Sasaki ................... B21D 35/00
                                                    72/333
(Continued)

FOREIGN PATENT DOCUMENTS

CN         1253247 A    5/2000
CN       101680048 A    3/2010
(Continued)

OTHER PUBLICATIONS

JP4845813B2_English_translation.pdf, (Year: 2011).*
(Continued)

*Primary Examiner* — Colleen P Dunn
*Assistant Examiner* — Jiangtian Xu
(74) *Attorney, Agent, or Firm* — McDermott Will & Emery LLP

(57) ABSTRACT

A first step of setting a steel material heated to a temperature not lower than an $A_1$ transformation point on a forming table and a second step of punching a ring-form member from the steel material and thereafter forming and quenching the ring-form member on the forming table are included. A press die is constructed to be dividable into an inner cylinder and an outer cylinder. In the second step, the ring-form member is punched from a coil material by pressing a tip end portion of the inner cylinder and a tip end portion of the outer cylinder against the coil material. The punched ring-form member is formed and quenched by further pressing a tip
(Continued)

end of the inner cylinder against the ring-form member while the ring-form member is held between the outer cylinder and a forming die.

6 Claims, 15 Drawing Sheets

(51) Int. Cl.
| | |
|---|---|
| *F16C 19/46* | (2006.01) |
| *F16C 33/64* | (2006.01) |
| *F16C 19/30* | (2006.01) |
| *B21D 22/02* | (2006.01) |
| *B21D 53/16* | (2006.01) |
| *B21D 19/08* | (2006.01) |
| *B21D 28/02* | (2006.01) |
| *B21D 22/20* | (2006.01) |
| *B21D 24/16* | (2006.01) |
| *B21D 28/14* | (2006.01) |
| *C21D 1/18* | (2006.01) |
| *C21D 1/42* | (2006.01) |
| *C21D 1/40* | (2006.01) |
| *B21D 25/00* | (2006.01) |
| *B21D 22/06* | (2006.01) |

(52) U.S. Cl.
CPC ............ *B21D 24/16* (2013.01); *B21D 28/02* (2013.01); *B21D 28/14* (2013.01); *B21D 53/16* (2013.01); *C21D 1/18* (2013.01); *C21D 1/42* (2013.01); *C21D 9/40* (2013.01); *F16C 19/30* (2013.01); *F16C 19/46* (2013.01); *F16C 33/64* (2013.01); *B21D 22/06* (2013.01); *B21D 25/00* (2013.01); *C21D 1/40* (2013.01); *C21D 2211/008* (2013.01); *Y02P 10/253* (2015.11)

(56) References Cited

U.S. PATENT DOCUMENTS

| | | |
|---|---|---|
| 2003/0056563 A1 | 3/2003 | McClung |
| 2008/0053578 A1 | 3/2008 | Maeda et al. |
| 2010/0054651 A1 | 3/2010 | Kudou et al. |
| 2013/0136387 A1 | 5/2013 | Fugel et al. |
| 2014/0048179 A1 | 2/2014 | Fujita et al. |

FOREIGN PATENT DOCUMENTS

| | | | |
|---|---|---|---|
| CN | 103492613 A | | 1/2014 |
| CN | 203649153 U | | 6/2014 |
| EP | 2159292 A1 | | 3/2010 |
| JP | H07-265987 A | | 10/1995 |
| JP | 2003-004051 A | | 1/2003 |
| JP | 2005-169475 A | | 6/2005 |
| JP | 2007-170447 A | | 7/2007 |
| JP | 2008-082435 A | | 4/2008 |
| JP | 2008-296262 A | | 12/2008 |
| JP | 4845813 B2 | * | 12/2011 |
| JP | 2012-081520 A | | 4/2012 |
| JP | 2013-164093 A | | 8/2013 |

OTHER PUBLICATIONS

Extended European search report issued in corresponding European Patent Application No. 16844167.3, dated Apr. 8, 2019.
Office Action issued in corresponding Chinese Patent Application No. 201680051928.X, dated Apr. 28, 2019, with English translation.
Second Office Action issued in corresponding Japanese Patent Application No. 201680051928.X, dated Dec. 23, 2019, with English translation.
Second Office Action issued in corresponding Chinese Patent Application No. 201680051928.X, dated Dec. 23, 2019, with English translation.
Search Report issued in corresponding International Patent Application No. PCT/JP2016/074476, dated Nov. 22, 2016.

* cited by examiner

FIG.10
(a)
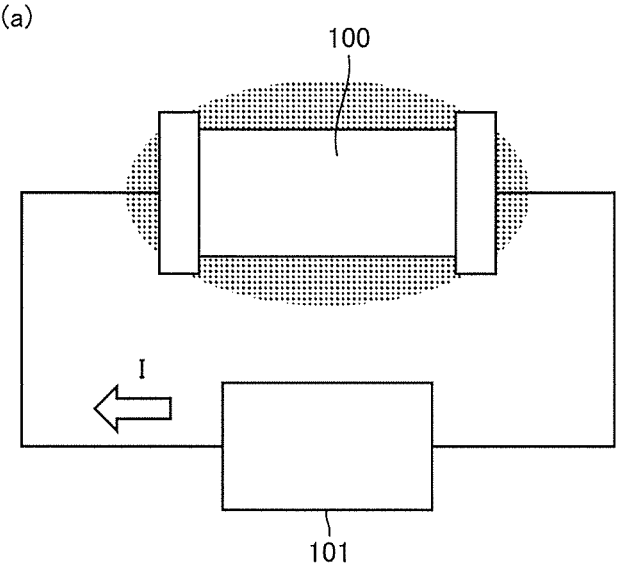
(b)
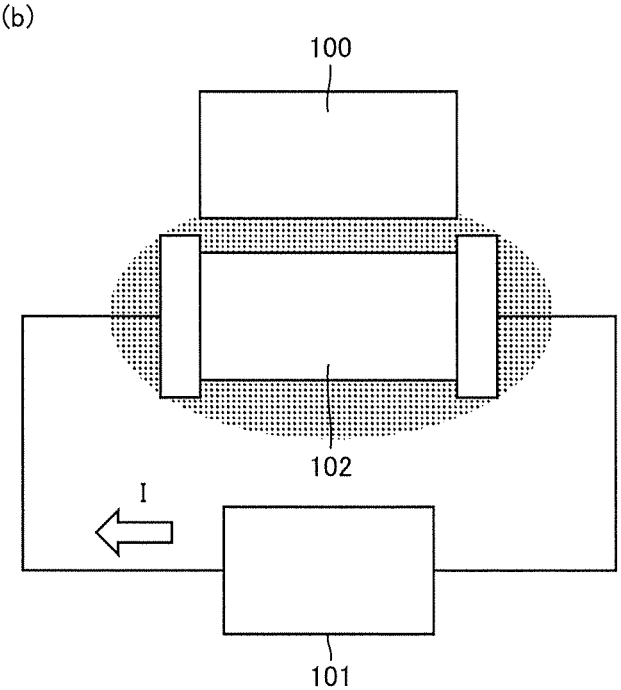

METHOD OF MANUFACTURING ROLLING BEARING RING

CROSS REFERENCE

This application is the U.S. National Phase under 35 U.S.C. § 371 of International Application No. PCT/JP2016/074476, filed on Aug. 23, 2016, which claims the benefit of Japanese Application No. 2015-176495, filed on Sep. 8, 2015, the entire contents of each are hereby incorporated by reference.

TECHNICAL FIELD

The present invention relates to a method of manufacturing a rolling bearing ring and particularly relates to a method of manufacturing a rolling bearing ring which achieves a shortened manufacturing process.

BACKGROUND ART

A rolling bearing ring of a thrust needle bearing has conventionally been manufactured in a process below. Initially, a coil material obtained by winding up like a coil, a rolled steel material in a form of a thin plate is prepared. Then, the steel material in the form of the thin plate rolled back from the coil material is sequentially punched and formed. Thus, a formed object in a ring form having an approximate shape of a rolling bearing ring is obtained. Then, a setup step before heat treatment is performed. Then, the formed object in the ring form is subjected to heat treatment such as carburization. Thereafter, the formed object is quenched by cooling the formed object with air blast. Finally, the formed object is shaped by press-tempering the quenched formed object (tempering). A rolling bearing ring of a thrust needle bearing is manufactured in the process as above.

Die quenching has been known as a technique for forming a steel material. Die quenching is a technique for press-forming a heated steel material and simultaneously quenching the steel material by rapidly cooling the steel material in a die (for example, Japanese Patent Laying-Open No. 2008-296262 (PTD 1)).

CITATION LIST

Patent Document

PTD 1: Japanese Patent Laying-Open No. 2008-296262

SUMMARY OF INVENTION

Technical Problem

As above, the conventional process for manufacturing a rolling bearing ring of a thrust needle bearing includes many steps such as punching, forming, heat treatment, quenching, and tempering. Since the rolling bearing ring of the thrust needle bearing is small in thickness, the setup step before heat treatment is bothersome. Thus, cost for manufacturing a rolling bearing ring has conventionally been high due to many steps in the manufacturing process. Therefore, it is required to be able to provide a more inexpensive rolling bearing ring by shortening the process for manufacturing a rolling bearing ring to thereby reduce manufacturing cost. It is also required, on the other hand, to pay attention not to deteriorate accuracy in forming of a rolling bearing ring by shortening the process.

The present invention was made in view of the problems above and an object is to provide a method of manufacturing a rolling bearing ring which achieves a shortened manufacturing process while accuracy in forming of a rolling bearing ring is satisfactorily maintained. Another object of the present invention is to provide a more inexpensive rolling bearing ring of which manufacturing cost has been reduced.

Solution to Problem

In summary, this invention is directed to a method of manufacturing a rolling bearing ring which includes a first step of setting a steel material heated to a temperature not lower than an $A_1$ transformation point on a forming table and a second step of punching a ring-form member from the steel material and thereafter forming and quenching the ring-form member on the forming table. The forming table includes a first die and a second die. The second die is constructed to be dividable into an inner cylinder and an outer cylinder. In the second step, the ring-form member is punched from the steel material by arranging the steel material between the first die and the second die and pressing a tip end portion of the inner cylinder and a tip end portion of the outer cylinder against the steel member, and the ring-form member is formed and quenched by further pressing a tip end of any one of the inner cylinder and the outer cylinder against the punched ring-form member while the ring-form member is held between any the other of the inner cylinder and the outer cylinder and the first die.

According to the manufacturing method, punching, forming, and quenching can be performed in a short period of time without requiring an intermediate setup operation. Therefore, manufacturing can be inexpensive and working accuracy in forming is also satisfactory.

Preferably, in the second step, punching is performed in a first stage and drawing as forming is performed together with quenching in a second stage.

The manufacturing method is particularly suitable for a shape like a rolling bearing ring.

More preferably, in the second step, a time period from start of punching of the ring-form member until completion of forming is within 0.1 second.

In the manufacturing method, punching and forming are performed in a short period of time and quenching by die quenching is immediately performed. Therefore, the ring-form member is not gradually cooled before quenching and an effect of quenching is high.

Preferably, holding force with which the ring-form member is held between any one of the inner cylinder and the outer cylinder and the first die in the second step is not lower than 0.2 MPa.

Since holding force is thus high, wrinkles or fractures are less likely during drawing.

Preferably, the steel material contains at least 0.4 mass % of carbon and has a thickness not greater than 2 mm, and a ring form is punched from the steel material in a direction of thickness.

Since such a steel material is used, quenching is satisfactorily performed and the inside can also be quenched in die-quenching.

Preferably, the rolling bearing ring manufactured with the method of manufacturing a rolling bearing ring has a hardness not lower than 700 HV.

Advantageous Effects of Invention

According to the method of manufacturing a rolling bearing ring according to the present invention, a process for manufacturing a rolling bearing ring can further be shortened while accuracy in forming of a rolling bearing ring is satisfactorily maintained. According to the rolling bearing ring according to the present invention, a more inexpensive rolling bearing ring of which manufacturing cost has been reduced can be provided.

BRIEF DESCRIPTION OF DRAWINGS

FIG. 10 is a diagram for illustrating resistance heating representing one example of a heating method.

DESCRIPTION OF EMBODIMENTS

Figure 1:
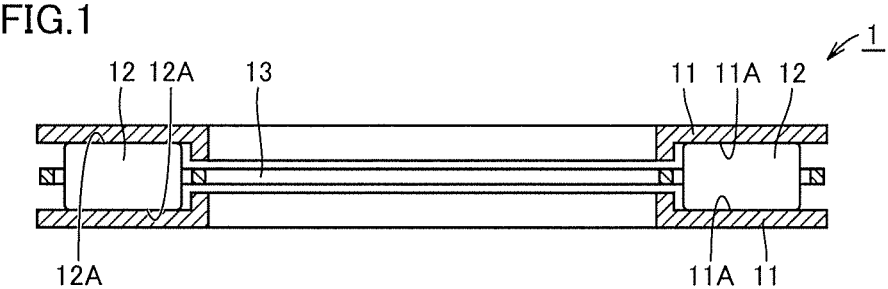
FIG. 1 is a diagram showing a structure in a cross-section along an axial direction of a thrust needle roller bearing 1.

An embodiment of the present invention will be described hereinafter with reference to the drawings. The same or corresponding elements in the drawings below have the same reference characters allotted and description thereof will not be repeated.

A construction of a thrust needle roller bearing 1 according to one embodiment of the present invention will initially be described. FIG. 1 shows a structure in a cross-section along an axial direction of thrust needle roller bearing 1. Referring to FIG. 1, thrust needle roller bearing 1 includes a pair of rolling bearing rings 11, a plurality of needle rollers 12, and a retainer 13.

Rolling bearing ring 11 is composed, for example, of steel in which a concentration of carbon is not lower than 0.4 mass %, and is in a disc shape with a hole being provided in the center. Rolling bearing ring 11 has a rolling bearing ring raceway surface 11A with which needle roller 12 is in contact at one main surface. The pair of rolling bearing rings 11 is arranged such that rolling bearing ring raceway surfaces 11A are opposed to each other. An inner circumferential side of rolling bearing ring 11 is shallowly bent to prevent rollers 12 from coming off. Rolling bearing ring 11 has a Vickers hardness not lower than 700 HV. Rolling bearing ring 11 has a flatness at rolling bearing ring raceway surface 11A of approximately 10 μm.

Needle roller 12 is composed, for example, of steel and has a roller rolling contact surface 12A at an outer circumferential surface. As shown in FIG. 1, needle roller 12 is arranged between the pair of rolling bearing rings 11 such that roller rolling contact surface 12A is in contact with rolling bearing ring raceway surface 11A.

Retainer 13 is composed, for example, of a resin, and retains a plurality of needle rollers 12 at a prescribed pitch in a circumferential direction of rolling bearing ring 11. More specifically, retainer 13 has a plurality of pockets (not shown) in an annular shape provided at an equal interval in the circumferential direction. Retainer 13 accommodates needle roller 12 in the pocket.

A plurality of needle rollers 12 are rollably retained by retainer 13 on an annular raceway along the circumferential direction of rolling bearing ring 11. With the construction above, thrust needle roller bearing 1 is constructed such that a pair of rolling bearing rings 11 can rotate relatively to each other. Rolling bearing ring 11 is manufactured with a method of manufacturing a rolling bearing ring according to the present embodiment described below.

Figure 2:
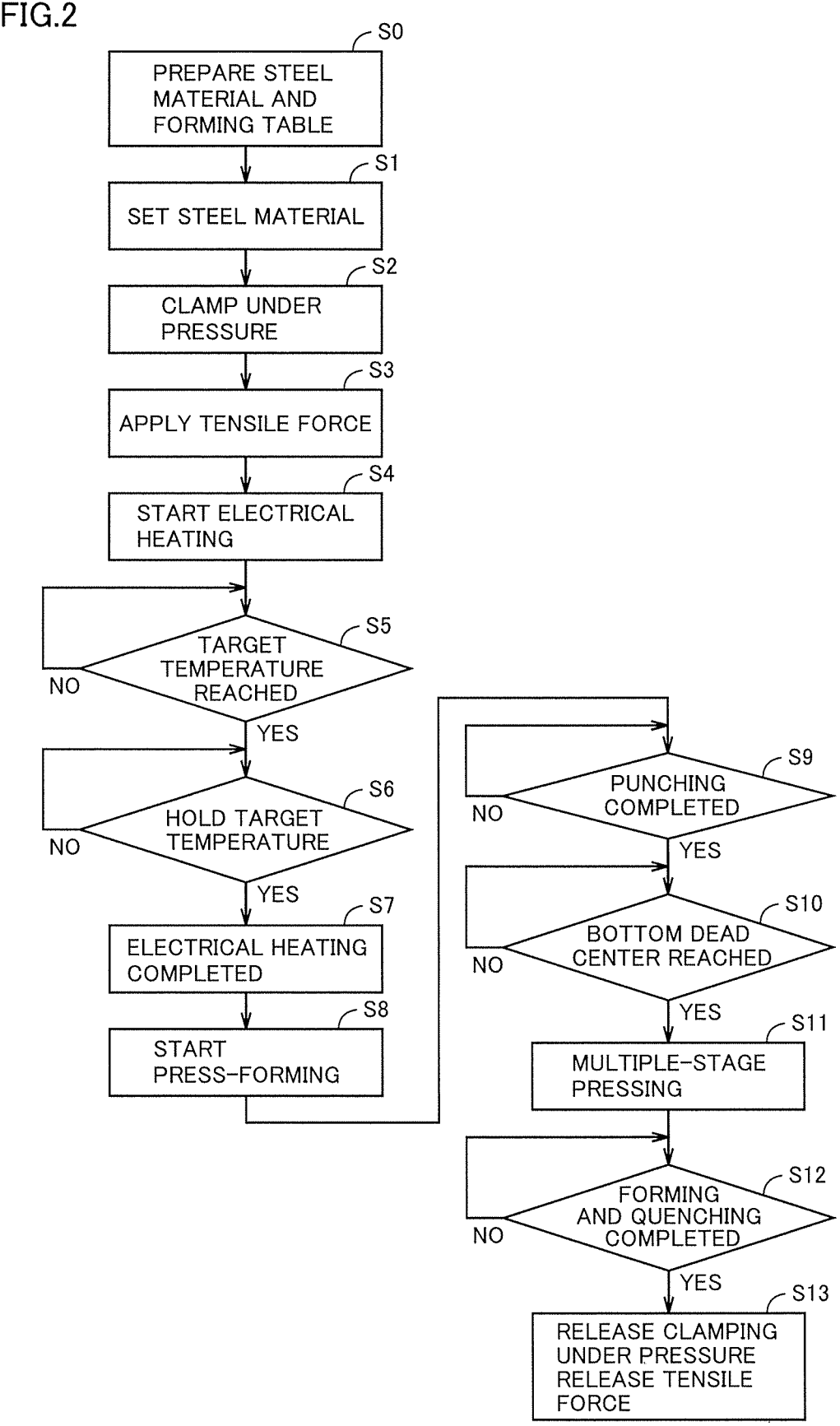
FIG. 2 is a flowchart schematically showing a method of manufacturing a rolling bearing ring according to the present embodiment.
Figure 3:
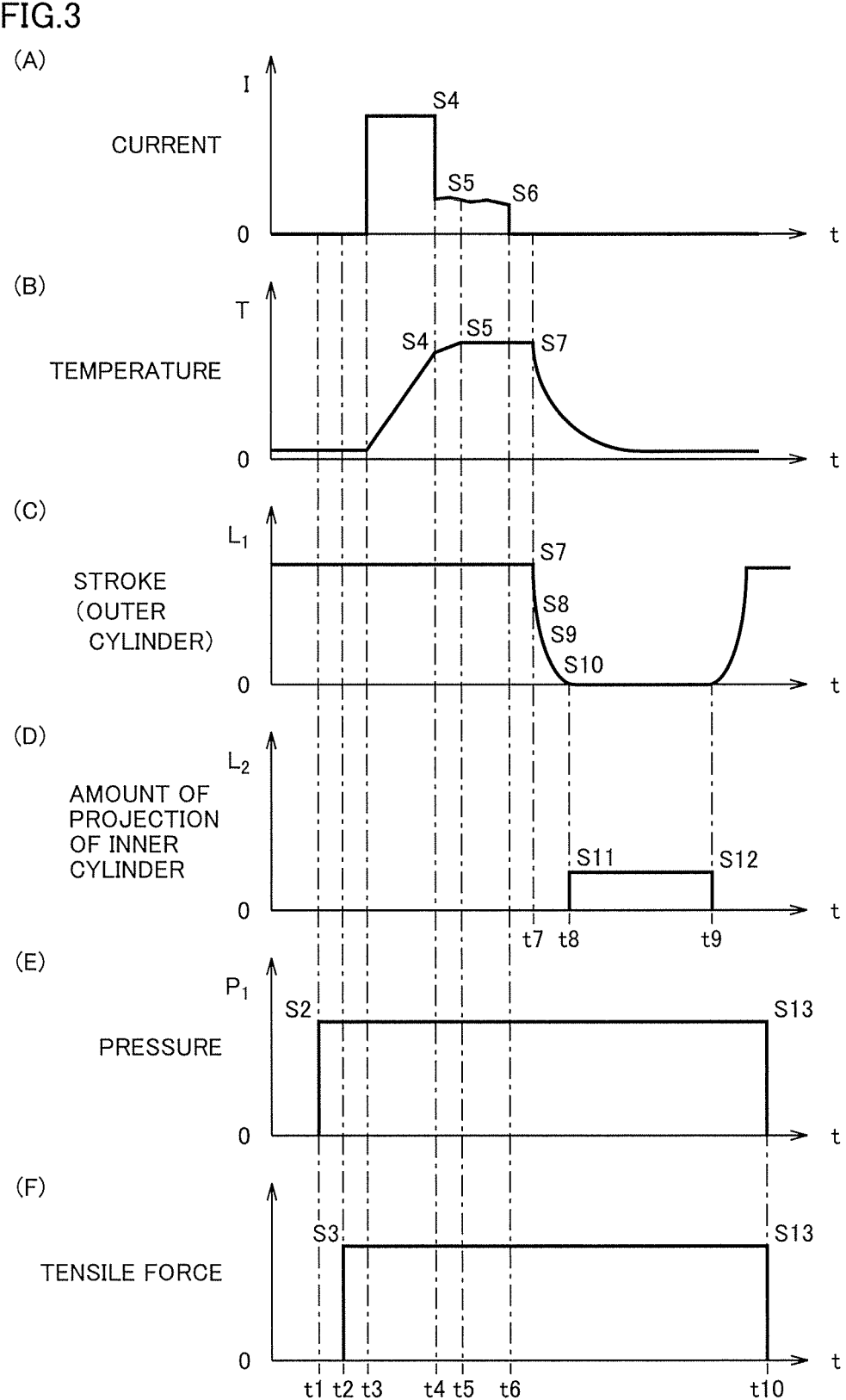
FIG. 3 is a waveform diagram for illustrating variation in various parameters in the method of manufacturing a rolling bearing ring according to the present embodiment.

FIG. 2 is a flowchart schematically showing the method of manufacturing a rolling bearing ring according to the present embodiment. FIG. 3 is a time chart for illustrating variation in various parameters in the method of manufacturing a rolling bearing ring according to the present embodiment. FIG. 3 shows (A) change over time in current supplied to a steel material, (B) change over time in temperature of the steel material, (C) a stroke (outer cylinder) of a press machine, (D) an amount of projection of an inner cylinder of the press machine, (E) a pressure of a hydraulic chuck, and (F) tensile force applied between first and second clamping portions.

The method of manufacturing a rolling bearing ring according to the present embodiment will be described below in the order of "S0 to S13" provided in FIGS. 2 and 3 mainly with reference to the flowchart in FIG. 2 and the time chart in FIG. 3.

Figure 4:
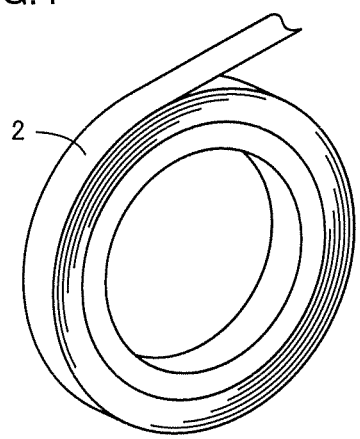
FIG. 4 is a diagram schematically showing a shape of a coil material as a steel material.

Initially, a steel material which is a material for obtaining rolling bearing ring 11 is prepared (S0). FIG. 4 is a diagram schematically showing a shape of a coil material as the steel material. As shown in FIG. 4, a coil material 2 is obtained by winding up like a coil, a rolled steel material in a form of a thin plate.

Coil material 2 is composed of steel containing, for example, at least 0.4 mass % of carbon. More specifically, coil material 2 is composed of steel such as SAE1070 defined under SAE standards, S40C and S45C, S50C, S55C, and S60C defined under JIS as carbon steel for machine structural use, SUJ2 defined under JIS as high carbon chromium bearing steel, SK85 defined under JIS as carbon tool steel, SCM440 and SCM445 defined under JIS as low-alloyed steel for machine structural use, SKS5 defined under JIS as an alloy tool steel, SUP13 defined under JIS as a spring steel, or SUS440C defined under JIS as stainless steel. Coil material 2 is a steel material in a form of a thin plate having a thickness not greater than 2 mm.

Then, a press machine 3 as a forming table for obtaining rolling bearing ring 11 from coil material 2 is prepared (S0) and coil material 2 is set on press machine 3 (S1). A construction of press machine 3 will be illustrated and described here.

Figure 5:
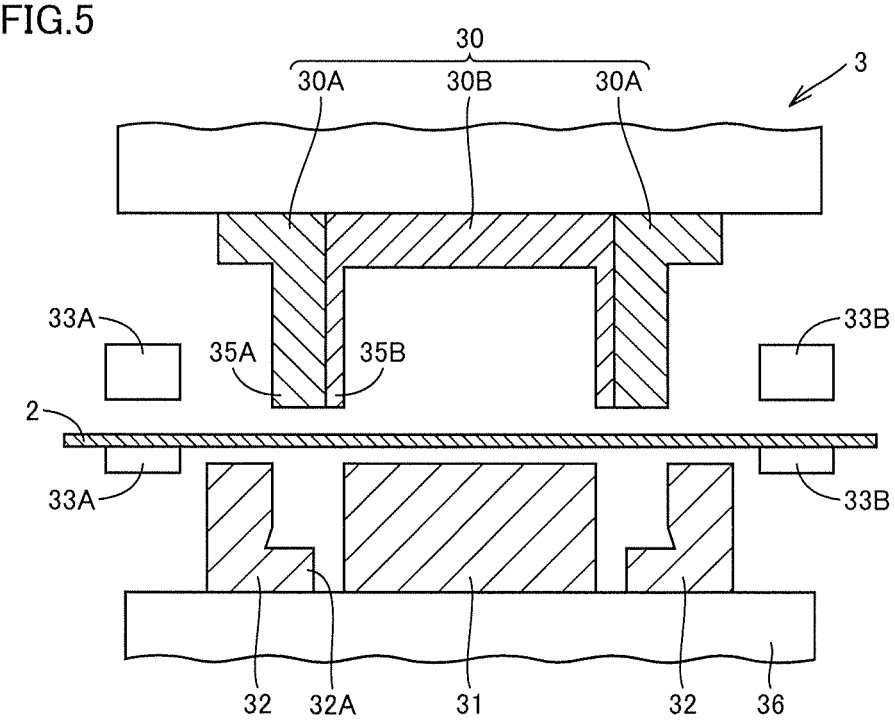
FIG. 5 is a diagram showing a cross-section along a vertical direction of a press machine 3.

FIG. 5 is a diagram showing a cross-section along a vertical direction (a direction of a stroke of the press) of press machine 3. Press machine 3 includes a press die 30, forming dies 31 and 32, and a first clamping portion 33A and a second clamping portion 33B.

Press die 30 is in a cylindrical shape. Press die 30 includes an outer cylinder 30A and an inner cylinder 30B. Outer cylinder 30A and inner cylinder 30B include pressing portions 35A and 35B provided at lower end portions of the cylindrical shape, respectively. Pressing portions 35A and 35B are portions which define lower end surfaces which are flush with each other at the time of pressing and serve for punching for shearing coil material 2 between the pressing portions and upper end surfaces of forming dies 31 and 32. Press die 30 is arranged to face forming dies 31 and 32 in the vertical direction. Press die 30 can be caused to make a stroke toward forming dies 31 and 32 or to move away from forming dies 31 and 32 by a not-shown drive mechanism. Forming dies 31 and 32 are fixed to a base 36 of the press machine.

Figure 6:
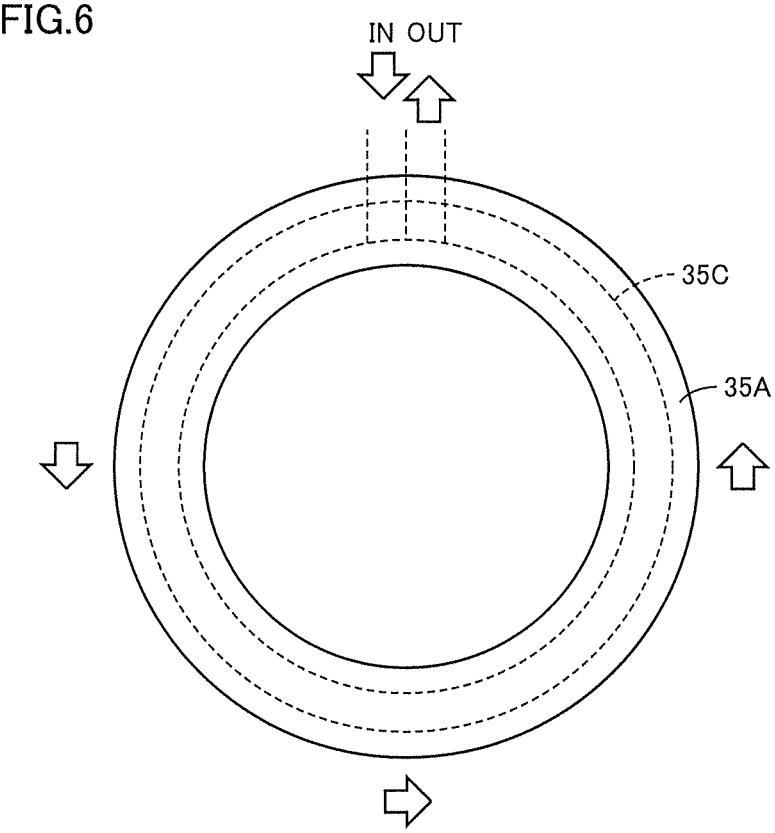
FIG. 6 is a diagram showing a pressing portion 35A in a plan view.

FIG. 6 is a diagram showing pressing portion 35A in a plan view. As shown with a dashed line in FIG. 6, a water cooling circuit 35C serving as a passage for cooling water is provided in pressing portion 35A along the circumferential direction. FIG. 6 shows an arrow showing a flow of cooling water. By thus cooling pressing portion 35A by circulating cooling water, coil material 2 can rapidly be cooled (die quenched) when pressing portion 35A is brought in contact with coil material 2. A passage for cooling water may be provided for cooling not only in pressing portion 35A of outer cylinder 30A but also similarly in forming die 32 and pressing portion 35B of inner cylinder 30B.

Referring again to FIG. 5, forming dies 31 and 32 are arranged to face press die 30 in the vertical direction. As shown in FIG. 5, forming die 31 has a columnar shape. Forming die 32 is in a ring form and has an inner diameter greater than a diameter of forming die 31. Forming die 32 is arranged outside forming die 31 such that a gap is provided between forming dies 31 and 32 in the radial direction. In forming die 32, a projection portion 32A projecting radially inward is formed in an inner circumferential portion thereof.

Figure 7:
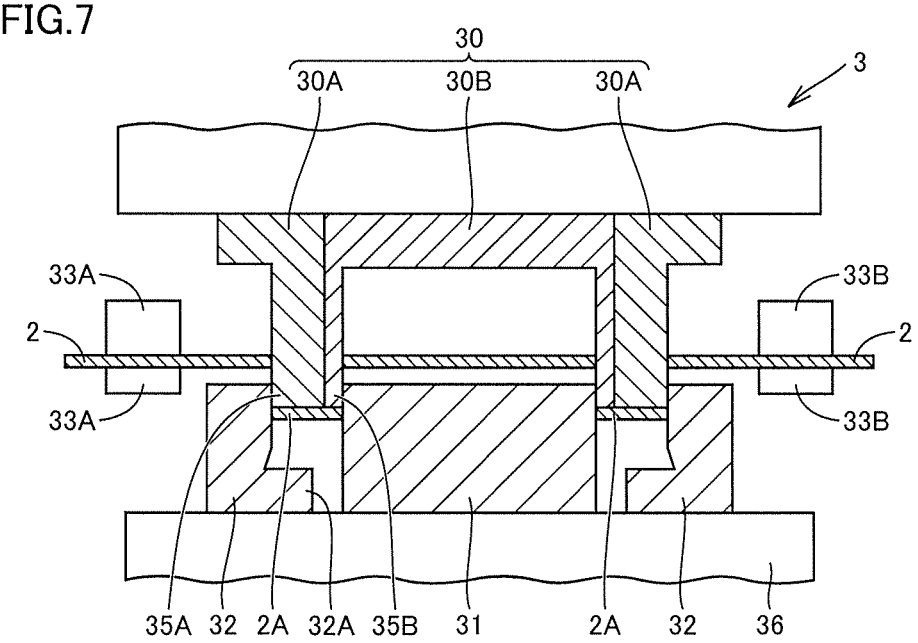
FIG. 7 is a cross-sectional view showing a state that a press die 30 is lowered from a state in FIG. 5 to punch a ring-form member.

FIG. 7 is a cross-sectional view showing a state that press die 30 is lowered from a state in FIG. 5 to punch a ring-form member.

As shown in FIG. 7, when press die 30 makes a stroke toward forming dies 31 and 32, pressing portions 35A and 35B are located in the gap between forming dies 31 and 32.

First clamping portion 33A and second clamping portion 33B serve to fix coil material 2 on press machine 3 and to apply tensile force to coil material 2. First clamping portion 33A and second clamping portion 33B are provided to be able to switch between a state in which coil material 2 is held in the vertical direction as shown in FIG. 7 and a state in which it is not held as shown in FIG. 5. Though first clamping portion 33A and second clamping portion 33B may be in any construction, they may be provided, for example, as a hydraulic clamp or an air clamp.

First clamping portion 33A and second clamping portion 33B are provided at positions where they are opposed to each other with press die 30 and forming dies 31 and 32 being interposed in a direction of extension of coil material 2. First clamping portion 33A is arranged on a supply side of coil material 2 in the direction of extension and second clamping portion 33B is arranged on an ejection side of coil material 2 in the direction of extension.

First clamping portion 33A and second clamping portion 33B are provided to be relatively movable in the direction opposed to each other (the direction of extension of coil material 2). For example, first clamping portion 33A and second clamping portion 33B are each a hydraulic clamp including a hydraulic cylinder (not shown) and movably provided so as to move away from each other in the direction in which they are opposed to each other owing to the hydraulic cylinder. Thus, first clamping portion 33A and second clamping portion 33B can apply tensile force in the direction of extension of coil material 2 to coil material 2 arranged between press die 30 and forming dies 31 and 32. Tensile force which can be applied to coil material 2 by first clamping portion 33A and second clamping portion 33B is higher than 0 MPa and not higher than 500 MPa. Tensile force refers to stress in a direction of length of coil material 2 (stress for extending coil material 2, specifically, stress applied to coil material 2 for clamping coil material 2 for power feed and removing deformation due to thermal expansion).

A power feed terminal is provided for supply of a current to coil material 2. The power feed terminal is connected to a direct-current (DC) power supply or an alternating-current (AC) power supply which is not shown and supplies a direct current or an alternating current to coil material 2. Coil material 2 can be heated by heat generation resulting from supply of the current. Though the power feed terminal may be located, for example, on an inner side relative to first clamping portion 33A and second clamping portion 33B and provided to be able to be in contact with a portion of coil material 2 where tensile force is applied by first clamping portion 33A and second clamping portion 33B, first clamping portion 33A and second clamping portion 33B may also serve as power feed terminals.

Press machine 3 sequentially operates as shown in the time chart in FIG. 3 below. Initially, at time t1, coil material 2 is clamped by first clamping portion 33A and second clamping portion 33B of press machine 3 (S2). A pressure P1 for holding coil material 2 is supplied to first clamping portion 33A and second clamping portion 33B.

Then, at time t2, tensile force is applied to coil material 2 (S3). Specifically, at least one of first clamping portion 33A and second clamping portion 33B is relatively moved so as to move away from the other thereof in the direction of extension of coil material 2. Thus, in coil material 2, tensile force in accordance with an amount of relative movement of first clamping portion 33A and second clamping portion 33B (an amount of change in distance between first clamping portion 33A and second clamping portion 33B) is applied to a region located between respective portions held by first clamping portion 33A and second clamping portion 33B. Tensile force applied to coil material 2 is, for example, higher than 0 MPa and not higher than 500 MPa. Relative positional relation between first clamping portion 33A and second clamping portion 33B is held at least until time t8 at which press-forming ends. Tensile force applied to coil material 2 is held at least during a period in which heating and press-forming are performed.

Then, at time t3, electrical heating is started (S4). Initially, the power feed terminal is moved to be in contact with coil material 2. Then, a current is supplied to coil material 2 through the power feed terminal. Thus, coil material 2 is heated by heat generation (Joule heat) resulting from supply of a current (electrical heating).

As a result of feed of a prescribed current for a period between time t3 and time t4, a temperature is increased, and at time t5, a temperature of coil material 2 reaches a target temperature (S5). The current is lowered at time t4 slightly before the target temperature is reached, and coil material 2 is held for a certain period of time at the target temperature for a period from time t5 to t6 (S6). At time t6, electrical heating of coil material 2 on press machine 3 is completed (S7).

A heating temperature (target temperature) of coil material 2 is a temperature not lower than an $A_1$ transformation point of steel forming coil material 2, and it is, for example, 1000° C. The "$A_1$ transformation point" refers to a point corresponding to a temperature at which a structure of steel starts transformation from ferrite to austenite when steel is heated. Therefore, the structure of steel which makes up coil material 2 transforms to austenite as a result of electrical heating.

Then, press-forming of coil material 2 is started (S8). Specifically, at time t7, press die 30 in FIG. 7 makes a stroke toward forming dies 31 and 32. At this stage, outer cylinder 30A and inner cylinder 30B integrally make a stroke. Thus, pressing portions 35A and 35B are in contact with coil material 2 and a part of coil material 2 is punched into a ring form in the direction of thickness of coil material 2 (S9). A ring-form member 2A in the ring form is thus obtained. Thereafter, at time t8, ring-form member 2A is formed.

Figure 8:
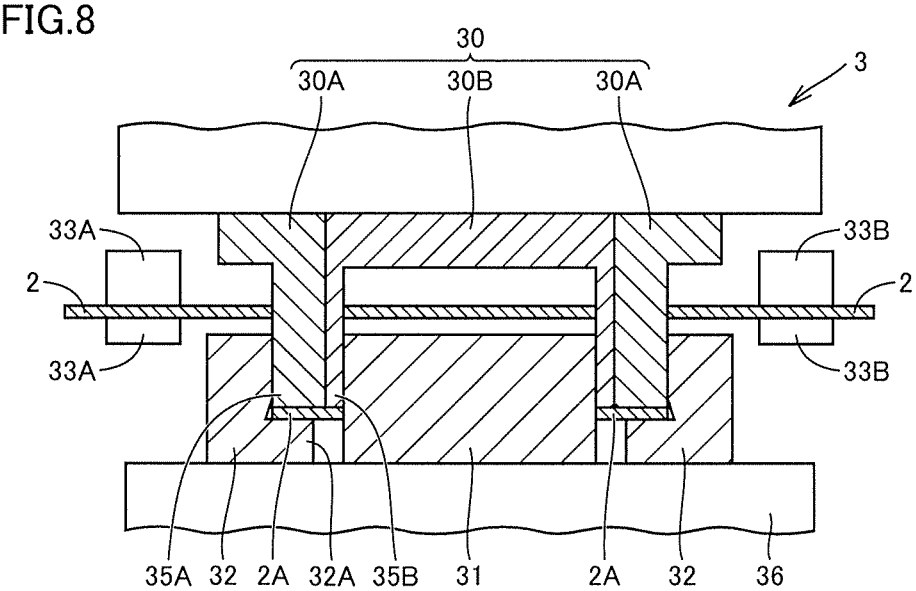
FIG. 8 is a cross-sectional view showing a former step of forming performed after punching.
Figure 9:
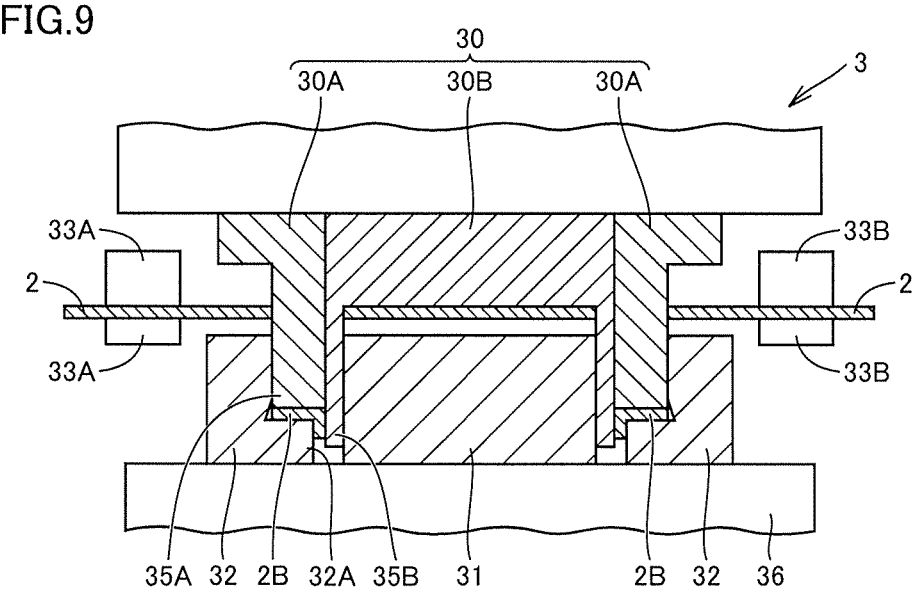
FIG. 9 is a cross-sectional view showing a latter step of forming performed after punching.

FIG. 8 is a cross-sectional view showing a former step of forming performed after punching. FIG. 9 is a cross-sectional view showing a latter step of forming performed after punching.

At time t8, as press die 30 makes a further stroke toward forming dies 31 and 32, pressing portion 35A of outer cylinder 30A is in contact with projection portion 32A of forming die 32 and reaches the bottom dead center (S10). The stroke of outer cylinder 30A remains at rest at the bottom dead center and inner cylinder 30B projects downward from outer cylinder 30A as shown in FIG. 3 (D). In a state shown in FIG. 8, ring-form member 2A is held between pressing portion 35A and projection portion 32A. Holding force at this time is not lower than 0.2 MPa and preferably not lower than 1 MPa.

Referring further to FIG. 9, as inner cylinder 30B projects downward from outer cylinder 30A, ring-form member 2A is drawn. An inner circumferential portion of ring-form member 2A is bent downward to be oriented in the direction of thickness of ring-form member 2A. Ring-form member 2A is thus subjected to multiple-stage pressing in press machine 3 (S11). As a result of this multiple-stage pressing, while outer cylinder 30A presses an outer circumferential portion of ring-form member 2A, inner cylinder 30B projects from outer cylinder 30A and the inner circumferential portion of ring-form member 2A is drawn by inner cylinder 30B, so that a formed object 2B is formed. By drawing the inner circumferential portion while the outer circumferential portion is pressed, wrinkles or fractures caused in the outer circumferential portion of formed object 2B can be prevented. Since drawing has to be performed while the temperature of ring-form member 2A is high, drawing should be completed immediately after outer cylinder 30A reaches the bottom dead center. A time period shown as time t7 to t8 from start of punching until completion of drawing is, for example, within 0.1 second and preferably within 0.02 second.

Then, formed object 2B is held for a certain period of time from time t8 to t9 while it is in contact with press machine 3 (press die 30 and forming dies 31 and 32). Here, since cooling water is supplied to water cooling circuit 35C in press die 30 as shown in FIG. 6, heat is removed from ring-form member 2A by cooled press die 30. A similar water cooling circuit may be provided also in forming die 32. Thus, ring-form member 2A is quenched as being rapidly cooled to a temperature not higher than an $M_s$ point.

The "$M_s$ point (martensite transformation point)" refers to a point corresponding to a temperature at which conversion to martensite is started when steel which was converted to austenite is cooled. Consequently, the structure of steel which makes up formed object 2B transforms into martensite. Quenching of formed object 2B (die quenching) is thus completed at time t9 (S12).

Finally, at time t10, a pressure supplied to first clamping portion 33A and second clamping portion 33B for holding coil material 2 is released and coil material 2 which is a refuse material and formed object 2B of which quenching has been completed are taken out of press machine 3. Tensile force applied to coil material 2 is relaxed (S13) by relaxing clamping force between first clamping portion 33A and second clamping portion 33B. With the manufacturing method including steps S0 to S13 as above, rolling bearing ring 11 is manufactured.

The method of manufacturing a rolling bearing ring according to the present embodiment is not limited as above but can variously be modified.

For example, in a method of applying tensile force to coil material 2, both of first clamping portion 33A and second clamping portion 33B may be provided outside press machine 3.

At least any method selected from the group consisting of indirect resistance heating, induction heating, contact heat transfer, and far-infrared heating can be adopted as the method of heating coil material 2, without being limited to electrical heating. Each heating method will be described below in further detail.

FIG. 10 is a diagram for illustrating resistance heating representing one example of a heating method. Two heating methods are available as resistance heating. One is a method of heating a heated object 100 with Joule heat generated as a result of direct power feed to heated object 100 having a resistance R1 as shown in FIG. 10 (*a*). Another is a method of indirectly heating heated object 100 arranged around a heat generator 102 having a resistance R2 with Joule heat generated as a result of power feed to heat generator 102 as shown in FIG. 10 (*b*).

Referring to FIG. 10 (*a*), in the method of heating heated object 100 by direct power feed, a current I is supplied from a power supply 101 to heated object 100 having resistance R1. Thus, heat generation ($P=R1 \cdot I^2$) owing to supply of current I occurs in heated object 100 and heated object 100 is heated. In the present embodiment, coil material 2 may be heated by heat generation resulting from supply of a direct current from the power feed terminal to coil material 2. Coil material 2 may be heated by heat generation resulting from supply of an alternating current from the power feed terminal to coil material 2.

Referring to FIG. 10 (*b*), in the method of indirectly heating heated object 100, current I is supplied from power supply 101 to heat generator 102 having resistance R2. Thus, heat generation ($P=R2 \cdot I^2$) resulting from supply of current I occurs in heat generator 102 and heat generator 102 is heated. In the present embodiment, a direct current or an alternating current may be supplied to heat generator 102.

Figure 11:
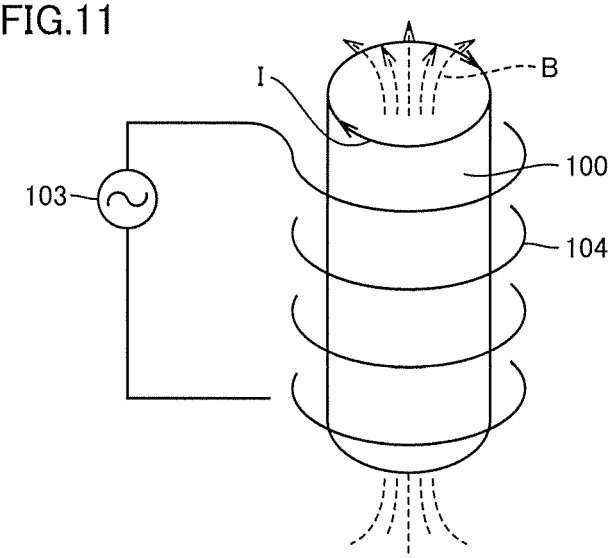
FIG. 11 is a diagram for illustrating induction heating representing another example of the heating method.

FIG. 11 is a diagram for illustrating induction heating representing another example of the heating method. Referring to FIG. 11, in induction heating, an alternating current is supplied from an AC power supply 103 to a coil 104 so that an alternating magnetic flux B is produced in heated object 100. An eddy current I is produced in heated object 100 in a direction cancelling alternating magnetic flux B. Then, heated object 100 is heated by heat generation resulting from eddy current I and a resistance R of heated object 100.

Figure 12:
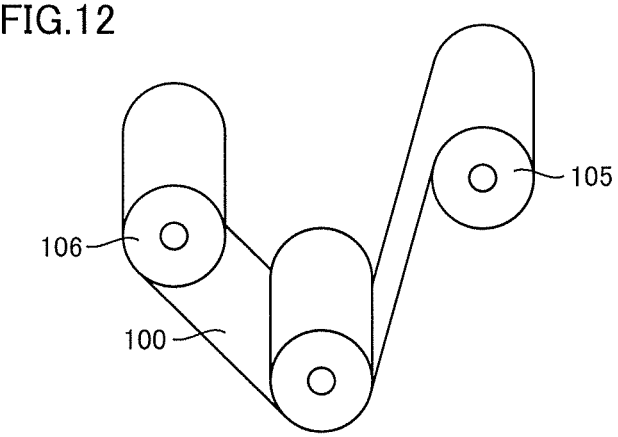
FIG. 12 is a diagram for illustrating contact heating representing another example of the heating method.

FIG. 12 is a diagram for illustrating contact heating representing another example of the heating method. Referring to FIG. 12, in contact heat transfer, heated object 100 is heated by heat transfer from an internal heating roll 106 and an external heating roll 105.

Though not shown, in far-infrared heating, far-infrared energy is provided to a heated object by irradiating the heated object with far-infrared rays. Heat generation results from activation of vibration between atoms which make up the heated object and the heated object is thus heated.

In the method of manufacturing a rolling bearing ring according to the present embodiment, as shown in FIG. 9, formed object 2B is formed in press machine 3 by bending by drawing the inner circumferential portion of ring-form member 2A so as to be oriented in the direction of thickness of ring-form member 2A, however, limitation thereto is not intended. For example, the outer circumferential portion rather than the inner circumferential portion of ring-form member 2A may be drawn.

Figure 13:
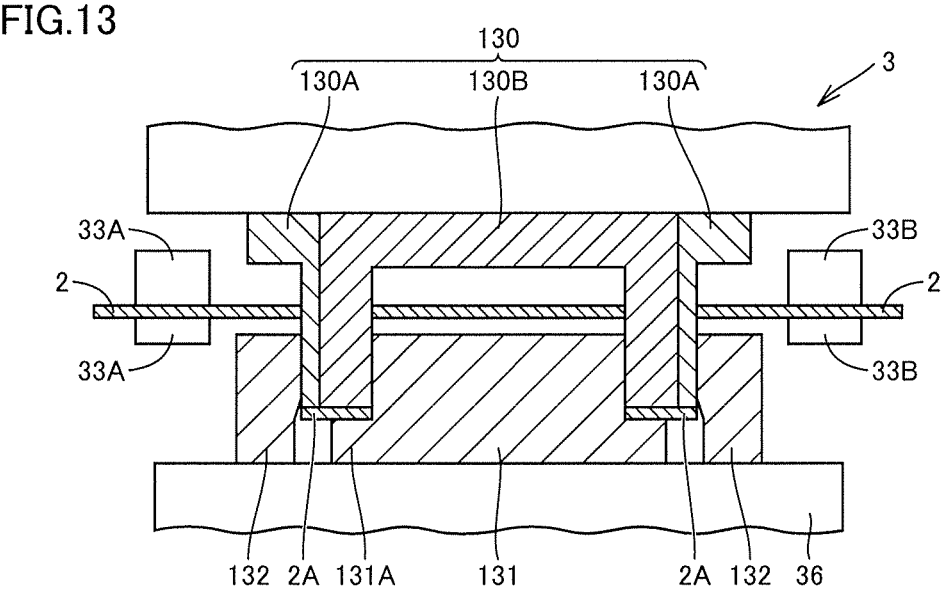
FIG. 13 is a first diagram for illustrating a modification of forming.
Figure 14:
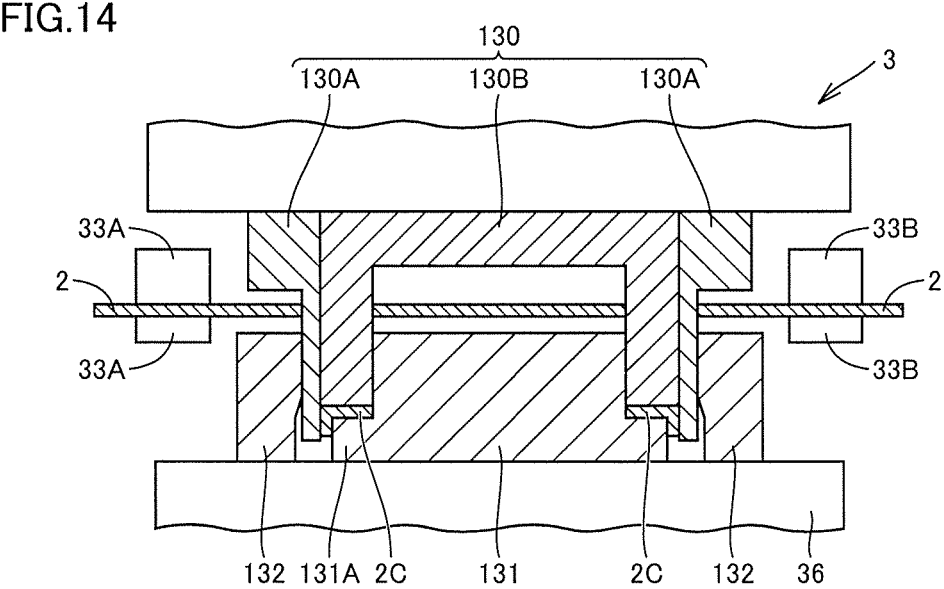
FIG. 14 is a second diagram for illustrating the modification of forming.

FIG. 13 is a first diagram for illustrating a modification of forming. FIG. 14 is a second diagram for illustrating the modification of forming.

In examples shown in FIGS. 13 and 14, the outer circumferential portion of ring-form member 2A in the ring form is formed to manufacture a formed object 2C. In this case, a projection portion 131A projecting radially outward on an outer circumferential surface of a forming die 131 is formed. Therefore, when a press die 130 makes a stroke as in the embodiment above, the inner circumferential portion of ring-form member 2A in the ring form is held between projection portion 131A and a tip end portion of an inner cylinder 130B.

Then, an outer cylinder 130A of press die 130 makes a further stroke relative to inner cylinder 130B. Thus, as shown in FIG. 14, the outer circumferential portion of ring-form member 2A is bent by drawing so as to be oriented in the direction of thickness of ring-form member 2A to thereby form formed object 2C. By doing so as well, ring-form member 2A can be formed in the press machine before quenching and an effect the same as in the embodiment above can be achieved.

Figure 15:
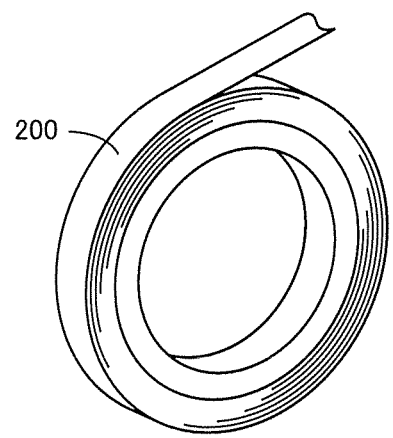
FIG. 15 is a diagram for illustrating a manufacturing method (preparation of a steel material) in a comparative example.
Figure 16:
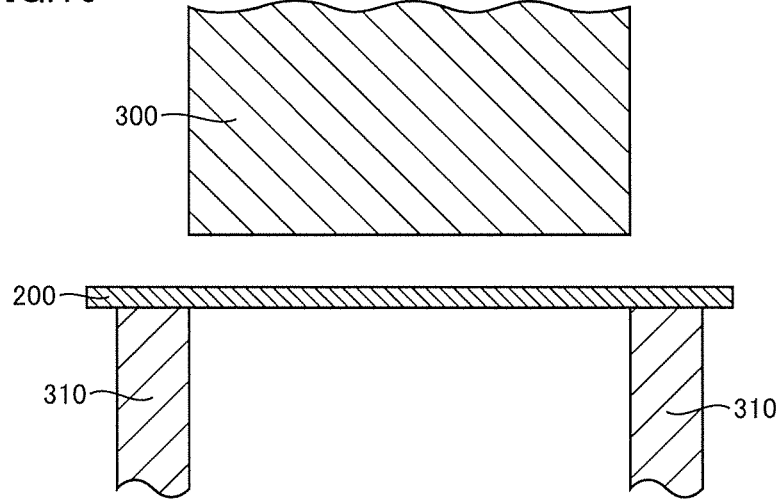
FIG. 16 is a first diagram for illustrating the manufacturing method (punching) in the comparative example.
Figure 17:
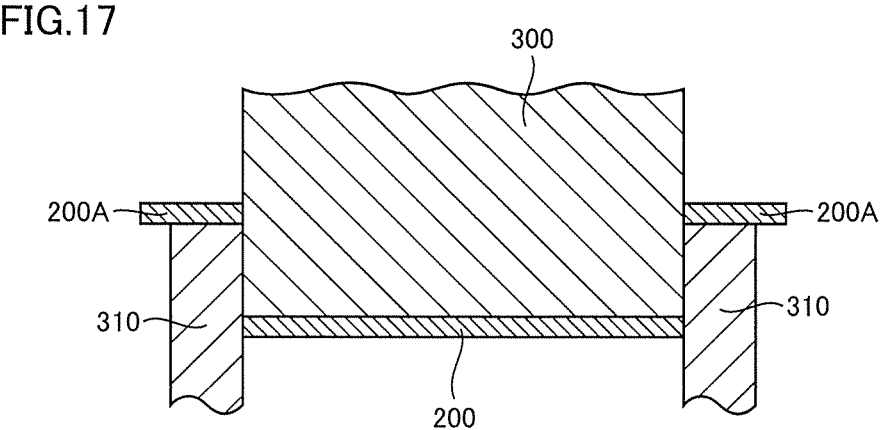
FIG. 17 is a second diagram for illustrating the manufacturing method (punching) in the comparative example.
Figure 18:
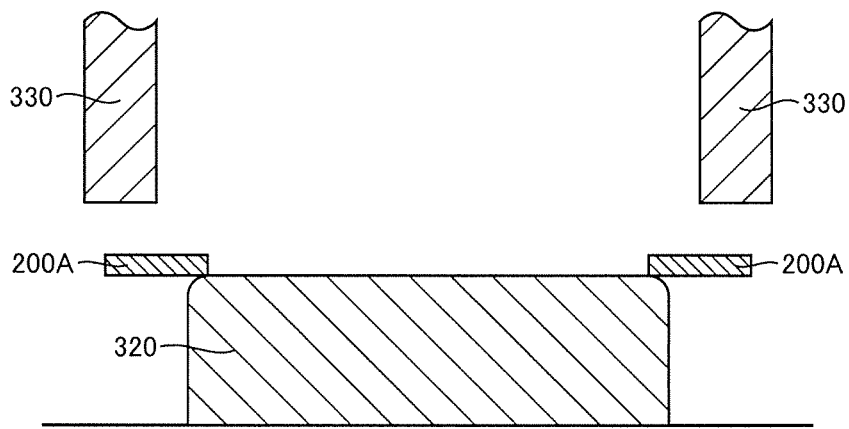
FIG. 18 is a first diagram for illustrating the manufacturing method (forming) in the comparative example.
Figure 19:
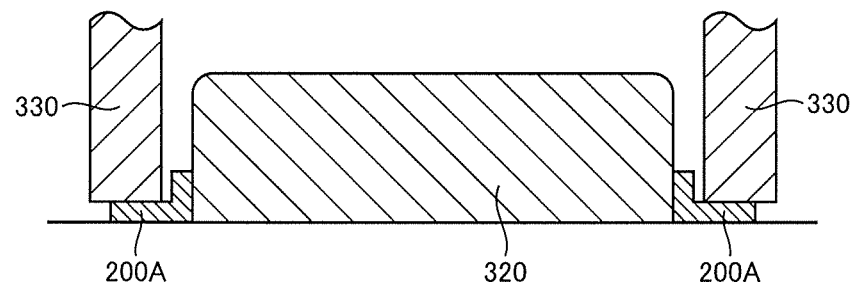
FIG. 19 is a second diagram for illustrating the manufacturing method (forming) in the comparative example.

A function and effect of the method of manufacturing a rolling bearing ring according to the present embodiment will now be described with reference to a comparative example. A method of manufacturing a rolling bearing ring in the comparative example will initially be described with reference to FIGS. 15 to 23. Referring to FIG. 15, initially, a coil material 200 obtained by winding up like a coil, a rolled steel material in a form of a thin plate is prepared. Then, referring to FIGS. 16 and 17, coil material 200 is set on a die 310 and a die 300 makes a stroke toward die 310. Coil material 200 is thus punched. A formed object 200A in a ring form is thus obtained. Then, referring to FIGS. 18 and 19, formed object 200A is set on a die 320 and a die 330 makes a stroke toward die 320, so that an inner circumferential portion of formed object 200A is formed.

Figure 20:
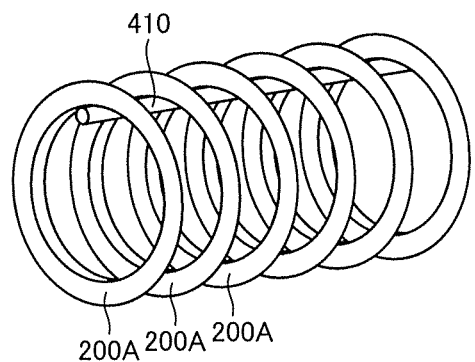
FIG. 20 is a first diagram for illustrating the manufacturing method (carburization and quenching) in the comparative example.
Figure 21:
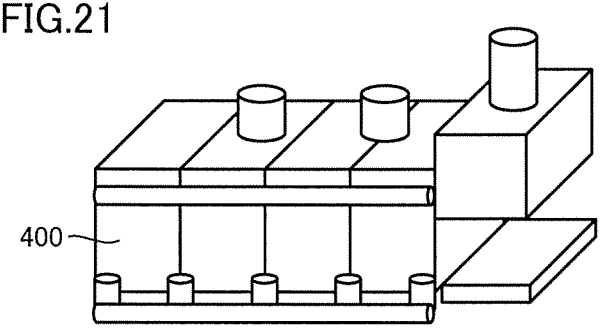
FIG. 21 is a second diagram for illustrating the manufacturing method (carburization and quenching) in the comparative example.
Figure 22:
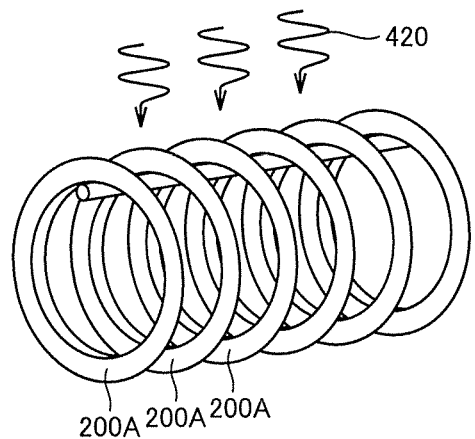
FIG. 22 is a third diagram for illustrating the manufacturing method (carburization and quenching) in the comparative example.
Figure 23:
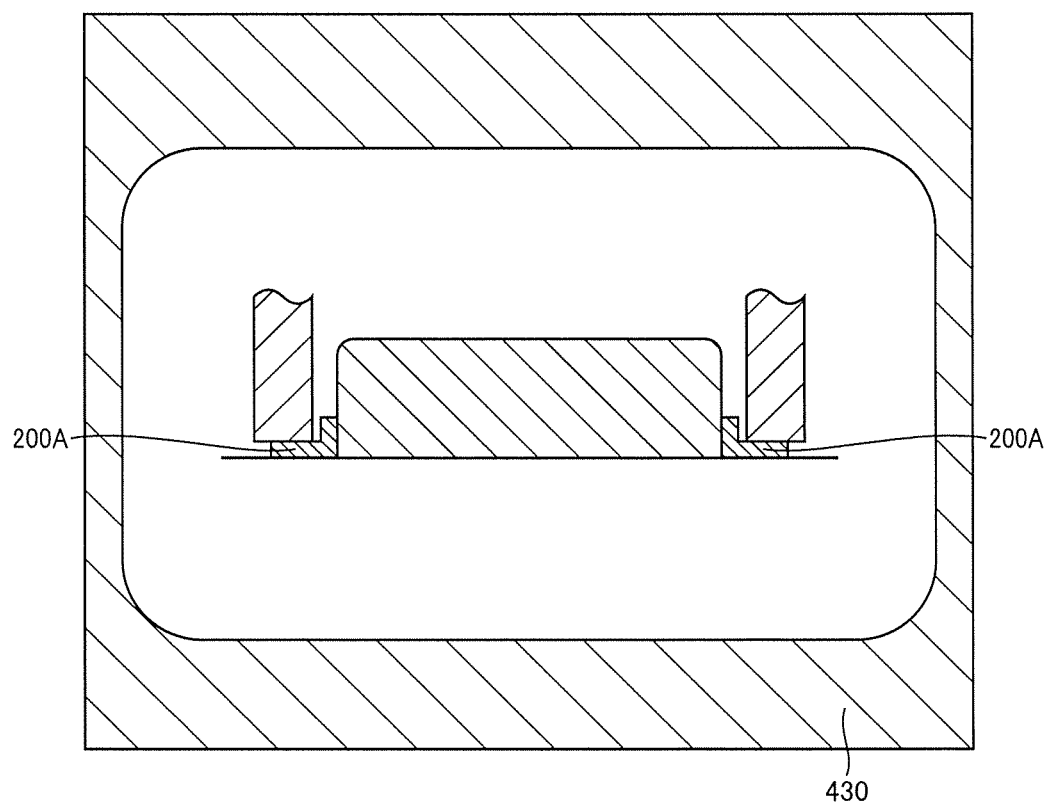
FIG. 23 is a diagram for illustrating the manufacturing method (press-tempering) in the comparative example.

Then, as shown in FIG. 20, in a setup step before heat treatment, a plurality of formed objects 200A are aligned as being hung over a bar 410. Thereafter, these formed objects 200A are placed in a carburization furnace 400 shown in FIG. 21 for carburization of formed objects 200A. Then, as shown in FIG. 22, carburized formed objects 200A are cooled by supplying air blast 420 so that formed objects 200A are quenched. Finally, referring to FIG. 23, quenched formed object 200A is press-tempered in a tempering furnace 430. Since the method of manufacturing a rolling bearing ring in the comparative example includes many steps as above, cost for manufacturing a rolling bearing ring is high.

In contrast, in the method of manufacturing a rolling bearing ring according to the present embodiment, steps of heating, punching, forming, and quenching coil material 2 are all performed as one step on press machine 3. Therefore, the manufacturing process can be shorter than in the method of manufacturing a rolling bearing ring in the comparative example in which the steps are separately performed. Consequently, cost for manufacturing a rolling bearing ring can further be reduced and a more inexpensive rolling bearing ring can be provided.

In the method of manufacturing a rolling bearing ring according to the present embodiment, in the step of obtaining the rolling bearing ring, the steel material is heated and punched while tensile force is applied to the steel material at least in one direction along the surface of the steel material. Therefore, quality of working of the obtained rolling bearing ring can be improved as compared with an example in which the steel material is heated and punched while no tensile force is applied to the steel material in the step of obtaining the rolling bearing ring.

In the method of manufacturing a rolling bearing ring according to the present embodiment, forming after punching is performed by drawing in multiple-stage pressing. As a result of multiple-stage pressing, ring-form member 2A in the ring form is drawn while the outer circumference (or the inner circumference) thereof is pressed. Therefore, wrinkles are less likely, an angle of bending can also be close to a right angle, and working accuracy is satisfactory.

It could be confirmed that rolling bearing ring 11 manufactured with the method of manufacturing a rolling bearing ring according to the present embodiment had high quality of working as a result of evaluation as below.

Figure 24:
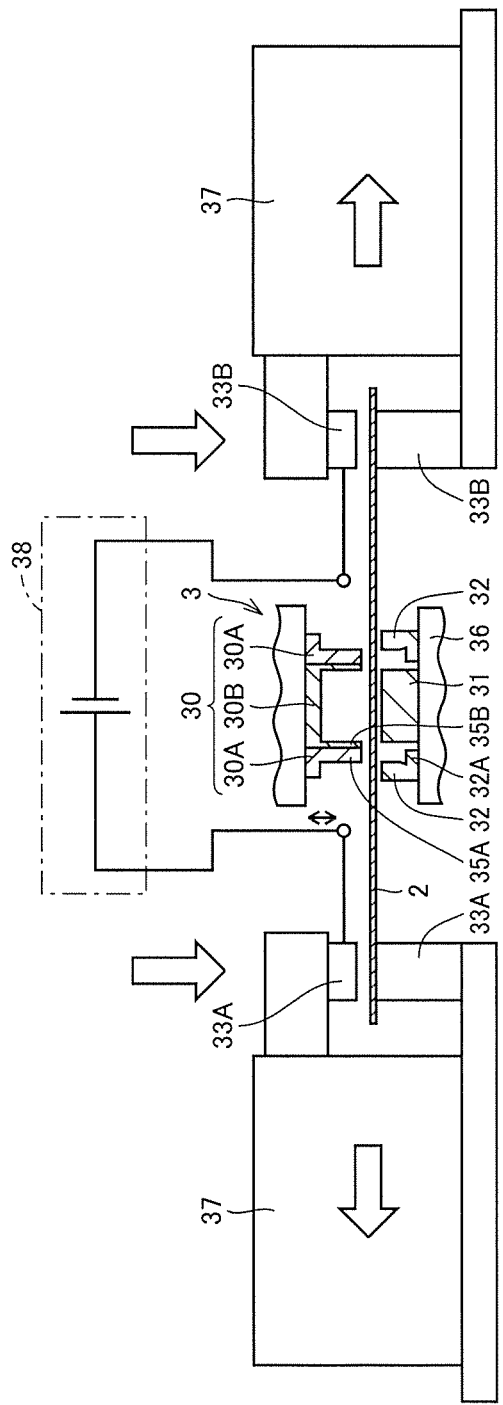
FIG. 24 is a diagram showing a construction of a press machine used for performing the method of manufacturing a rolling bearing ring according to the present embodiment.

FIG. 24 is a diagram showing a construction of a press machine used for performing the method of manufacturing a rolling bearing ring according to the present embodiment.

Press machine 3 shown in FIG. 24 is constructed such that first clamping portion 33A (which also serves as one power feed terminal) is connected to one cylinder 37 and second clamping portion 33B (which also serves as the other power feed terminal) is connected to another cylinder 37.

While tensile force of 10 MPa was applied to coil material 2 in the direction of extension with the use of press machine 3 shown in FIG. 24, coil material 2 was subjected to direct resistance heating to 1000° C. which was a temperature not lower than the $A_1$ transformation point, and thereafter to die quenching.

Figure 25:
FIG. 25 shows a photograph of a rolling bearing ring according to an Example.
Figure 26:
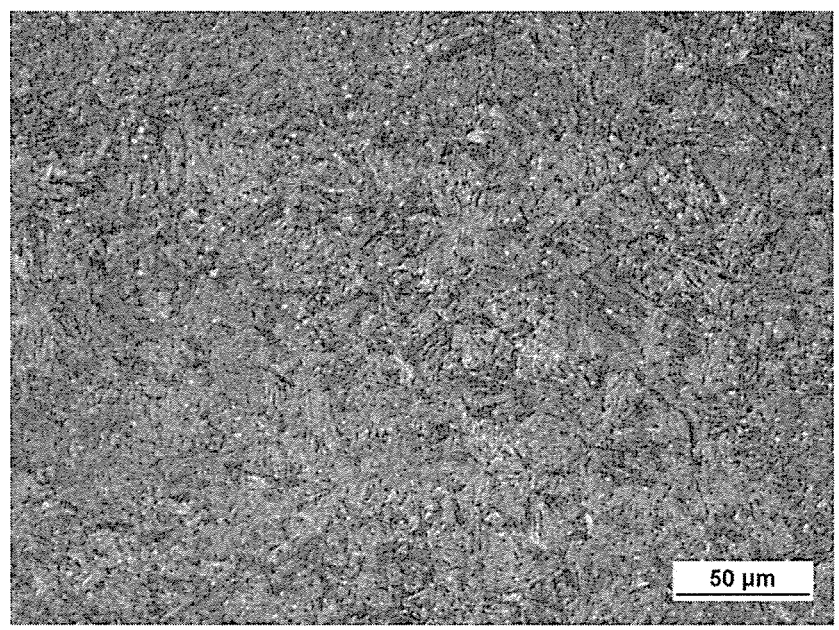
FIG. 26 shows a photograph of a steel structure in the rolling bearing ring according to the Example.

Rolling bearing ring 11 as shown in a photograph in FIG. 25 was thus manufactured. A Vickers hardness of a plurality of rolling bearing rings 11 (steel material: SAE1070) thus manufactured was measured, and consequently, an average hardness was approximately 790 HV. A part of rolling bearing ring 11 was cut, a cross-section thereof was corroded with nital, and a microstructure in the cross-section was observed with an optical microscope. Then, a martensite structure as in a photograph in FIG. 26 was observed.

A flatness of rolling bearing ring 11 was measured with the use of Talyrond, and consequently the flatness was approximately 10 μm. In contrast, a rolling bearing ring obtained by heating and punching coil material 2 while no tensile force was applied thereto in the step of obtaining a rolling bearing ring in the present embodiment had a flatness of approximately 40 μm.

Thus, it was confirmed that, according to the method of manufacturing a rolling bearing ring according to the present embodiment, the manufacturing process was shortened and rolling bearing ring 11 high in hardness and quality of working as a result of sufficient quenching could be manufactured.

Finally, the method of manufacturing a rolling bearing ring according to the present embodiment is summarized again with reference to the drawings. Referring to FIGS. 2 and 5, the method of manufacturing a rolling bearing ring according to the present embodiment includes a first step (S1 to S7) of setting a steel material heated to a temperature not lower than the $A_1$ transformation point on a forming table and a second step (S8 to S12) of punching a ring-form member from the steel material and thereafter forming and quenching the ring-form member on the forming table. The forming table includes a first die (forming dies 31 and 32) and a second die (press die 30). The second die is constructed to be dividable into inner cylinder 30B and outer cylinder 30A. In the second step, ring-form member 2A is punched from coil material 2 by arranging coil material 2 between the first die and the second die and pressing a tip end portion of inner cylinder 30B and a tip end portion of outer cylinder 30A against coil material 2. As shown in FIGS. 5 to 9, punched ring-form member 2A is formed and quenched by further pressing a tip end of inner cylinder 30B against ring-form member 2A while ring-form member 2A is held between outer cylinder 30A and forming die 32.

As shown in the modification, punched ring-form member 2A may be formed and quenched by further pressing a tip end of outer cylinder 130A against ring-form member 2A while it is held between inner cylinder 130B and forming die 131.

According to the manufacturing method, punching, forming, and quenching can be performed in a short period of time without requiring an intermediate setup operation. Therefore, manufacturing can be inexpensive and working accuracy in forming is also satisfactory.

Preferably, in the second step, punching is performed in a first stage and drawing as forming is performed together with quenching in a second stage.

The manufacturing method is particularly suitable for a shape like a rolling bearing ring.

More preferably, in the second step, a time period from start of punching of the ring-form member until completion of forming is within 0.1 second.

Since punching and forming are performed in a short period of time and quenching by die quenching is immediately performed in the manufacturing method, the ring-form member is not gradually cooled before quenching and an effect of quenching is high.

Preferably, holding force with which the ring-form member is held between any one of the inner cylinder and the outer cylinder and the first die in the second step is not lower than 0.2 MPa.

Since holding force is thus high, wrinkles or fractures are less likely in drawing. Preferably, the steel material contains at least 0.4 mass % of carbon and has a thickness not greater than 2 mm, and a ring form is punched from the steel material in a direction of thickness.

Since such a steel material is used, quenching is satisfactorily performed and the inside can be quenched also in die-quenching.

It should be understood that the embodiment disclosed herein is illustrative and non-restrictive in every respect. The scope of the present invention is defined by the terms of the claims, rather than the description of the embodiment above, and is intended to include any modifications within the scope and meaning equivalent to the terms of the claims.

REFERENCE SIGNS LIST 1 bearing; 2, 200 coil material; 2A, 2B, 2C, 200A formed object; 3 press machine; 11 rolling bearing ring; 11A rolling bearing ring raceway surface; 12 needle roller; 12A rolling contact surface; 13 retainer; 30, 130 press die; 30A, 130A outer cylinder; 30B, 130B inner cylinder; 31, 32, 131 forming die; 32A, 131A projection portion; 33A first clamping portion; 33B second clamping portion; 35A, 35B pressing portion; 35C water cooling circuit; 37 cylinder; 100 heated object; 101 power supply; 102 heat generator; 103 AC power supply; 104 coil; 105 external heating roll; 106 internal heating roll; 300, 310, 320, 330 die; 400 carburization furnace; and 430 tempering furnace

The invention claimed is:

1. A method of manufacturing a rolling bearing ring comprising:
   a first step of setting a steel material heated to a temperature not lower than an $A_1$ transformation point on a forming table; and
   a second step of punching a ring-form member from the steel material and thereafter forming and quenching the ring-form member on the forming table,
   the forming table including a first die and a second die,
   the second die being constructed to have an inner cylinder and an outer cylinder movable relative to each other, wherein
   in the second step, the ring-form member is punched from the steel material by arranging the steel material between the first die and the second die and pressing a tip end portion of the inner cylinder and a tip end portion of the outer cylinder against the steel material, and the ring-form member is formed and quenched by further pressing a tip end of either cylinder against the punched ring-form member while the punched ring-form member is held between the other cylinder and the first die such that one cylinder moves relative to the other cylinder.

2. The method of manufacturing a rolling bearing ring according to claim 1, wherein in the second step, punching is performed in a first stage and drawing as forming is performed together with quenching in a second stage.

3. The method of manufacturing a rolling bearing ring according to claim 2, wherein in the second step, a time period from start of the punching of the ring-form member until completion of the forming is within 0.1 second.

4. The method of manufacturing a rolling bearing ring according to claim 1, wherein holding force with which the ring-form member is held between any one of the inner cylinder and the outer cylinder and the first die in the second step is not lower than 0.2 MPa.

5. The method of manufacturing a rolling bearing ring according to claim 1, wherein the steel material contains at least 0.4 mass % of carbon and has a thickness not greater than 2 mm, and a ring form is punched from the steel material in a direction of thickness.

6. The method of manufacturing a rolling bearing ring according to claim 1, wherein the manufactured rolling bearing ring has a hardness not lower than 700 HV.

* * * * *